(12) United States Patent
Nguyen

(10) Patent No.: US 6,483,658 B1
(45) Date of Patent: Nov. 19, 2002

(54) METHOD OF MEASURING THE READ-TO-WRITE OFFSET IN A DISC DRIVE HAVING SEPARATE READ AND WRITE ELEMENTS

(75) Inventor: Hieu V. Nguyen, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 1803 days.

(21) Appl. No.: 08/576,397

(22) Filed: Dec. 21, 1995

Related U.S. Application Data

(63) Continuation of application No. 08/188,196, filed on Jan. 28, 1994, now abandoned.

(51) Int. Cl.[7] .................................................. G11B 5/58
(52) U.S. Cl. ........................................ 360/77.01; 360/75
(58) Field of Search ........................ 360/76, 66, 77.04, 360/77.06, 75, 77.01, 77.02

(56) References Cited

U.S. PATENT DOCUMENTS

| | | | |
|---|---|---|---|
| 4,346,413 A | * 8/1982 | Hack | 360/77.07 |
| 4,485,418 A | 11/1984 | Bremmer | 360/77 |
| 4,620,244 A | 10/1986 | Krause | 360/77 |
| 4,816,938 A | 3/1989 | Cowen et al. | 360/75 |
| 4,969,059 A | * 11/1990 | Volz et al. | 360/78.04 |
| 5,185,681 A | 2/1993 | Volz et al. | 360/77.05 |
| 5,233,487 A | * 8/1993 | Christensen et al. | 360/77.04 |
| 5,285,331 A | * 2/1994 | White | 360/77.06 |
| 5,408,367 A | * 4/1995 | Emo | 360/77.06 X |
| 5,500,776 A | * 3/1996 | Smith | 360/76 X |

FOREIGN PATENT DOCUMENTS

CA         2079666      * 4/1993    ............. 360/77.04

* cited by examiner

Primary Examiner—David Hudspeth
Assistant Examiner—K. Wong
(74) Attorney, Agent, or Firm—Mitchell K. McCarthy

(57) ABSTRACT

A method of measuring the read-to-write offset of a track in a disc drive system having separate read and write elements by measuring read error rate as a function of incremental actuator offset. The actuator is incrementally moved from one edge of the track to the other. The two radial positions which produce read error rates within acceptable limits are identified, and the read-to-write offset is determined by subtracting the offset at which the track was written, from the midpoint of the two radial positions. The read-to-write offset for each track accessed by the transducer is calculated from the read-to-write offset measured at the track.

11 Claims, 10 Drawing Sheets

METHOD OF MEASURING THE READ-TO-WRITE OFFSET IN A DISC DRIVE HAVING SEPARATE READ AND WRITE ELEMENTS

This application is a continuation of Ser. No. 80/188,196 filed Jan. 28, 1994 now abandoned.

BACKGROUND OF THE INVENTION

The present invention is a method of measuring the read-to-write offset in a disc drive system having separate read and write elements. More specifically, the present invention is a method of measuring the read-to-write offset by measuring read errors as a function of incremental offset within a track.

In the prior art, a disc drive head was typically comprised of a single thin film transducer, which performed both read and write functions. As the state of disc drive design evolved, track widths became narrower. It has became increasingly difficult to combine the read and write functions in a single thin film transducer. Accordingly, disc drive designers began to use separate read and write elements. Typically, the write element was comprised of a thin film transducer optimized to perform the write function. The read element typically comprised a magnetoresistive (MR) sensor. The MR sensor was formed from a strip of magnetoresistive material, typically Permalloy, which had a resistance which varied with the magnitude of flux passing through the sensor. The MR sensor was optimized to perform read functions, and was usually narrower than the write element.

Because the read and write elements cannot occupy the same physical space, a gap exists between the two elements. In a disc drive having a linear actuator, the effect of the gap can be minimized because the two elements can be placed in-line, and will remain in-line for every track on the disc surface. However, linear actuators are rarely used in modern disc drives because they are slower, require more space, and are not as precise as rotary actuators.

Most newer disc drives employ a rotary actuator. A rotary actuator includes an arm which is rotatably mounted to traverse an arc across the disc surface. Because the arm traverses an arc, the gap between the read and write elements results in a read-to-write offset. While the read and write elements might in-line for a single track, they typically will not be in-line for other tracks on the disc surface.

Accordingly, it is desirable to have a method for measuring and managing the read-to-write offsets for every track on disc drive surface and every pair of read and write elements in a disc drive system.

SUMMARY OF THE INVENTION

The present invention is method for measuring the read-to-write offset of a track on a disc drive system having a transducer with separate read and write elements. An "error bucket" is mapped, and actuator offsets are determined from the error bucket. The read-to-write offset is determined from the difference between the center of the error bucket and the offset at which the track was written.

In one form of the present invention, the read-to-write offset of all tracks accessed by a transducer can be calculated from a single measured read-to-write offset. In other forms of the invention, the read-to-write offsets of additional tracks are measured.

DETAILED DESCRIPTION OF THE PREFERRED EMBODIMENTS

Figure 1:
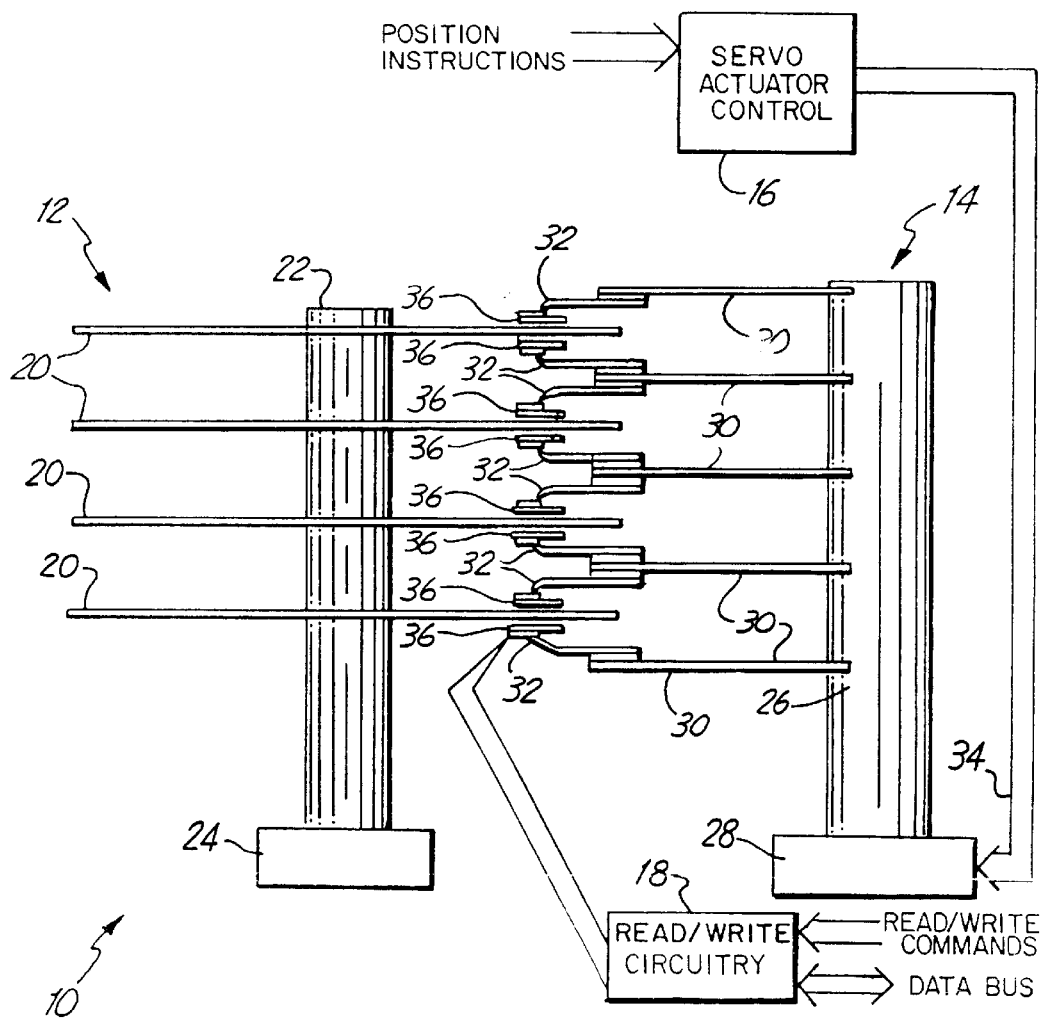
FIG. 1 is a view of a disc drive system having a rotary actuator.

FIG. 1 shows disc drive system 10, which is comprised of disc pack 12, actuator 14, actuator control 16, read/write circuitry 18, and processor 19. Disc pack 12 is comprised of discs 20, spindle 22, and spindle motor 24. Each disc 20 is mounted to spindle 22. Spindle 22 is rotated by spindle motor 24.

Actuator 14 is comprised of E-block 26, actuator motor 28, support arms 30, flexure arms 32, and sliders 36. E-block 26 is rotatably mounted to move support arms 30. Each support arm 30 is attached to either one or two flexure arms 32, and each flexure arm 32 is attached to a slider 36. The sliders 36 fly over surfaces of the discs 20, with each slider 36 carrying a transducer which is comprised of separate read and write elements.

The read and write elements carried by each slider 36 are electrically coupled to read/write circuitry 18. Read/write circuitry 18 includes circuitry for producing a write signal to drive the write elements, amplifying circuitry for producing a read signal from the read elements, error detection means for detecting read errors. Read/write circuitry 18 outputs read data and data error signals to processor 19 which controls servo actuator control 16.

Actuator control 16 is coupled to actuator motor 28 by actuator bus 34. In this embodiment, actuator 28 is depicted as a motor mounted coaxially with spindle 14. However, in other embodiments actuator motor 28 comprises a voice-coil motor, as is known in the art.

Figure 2:
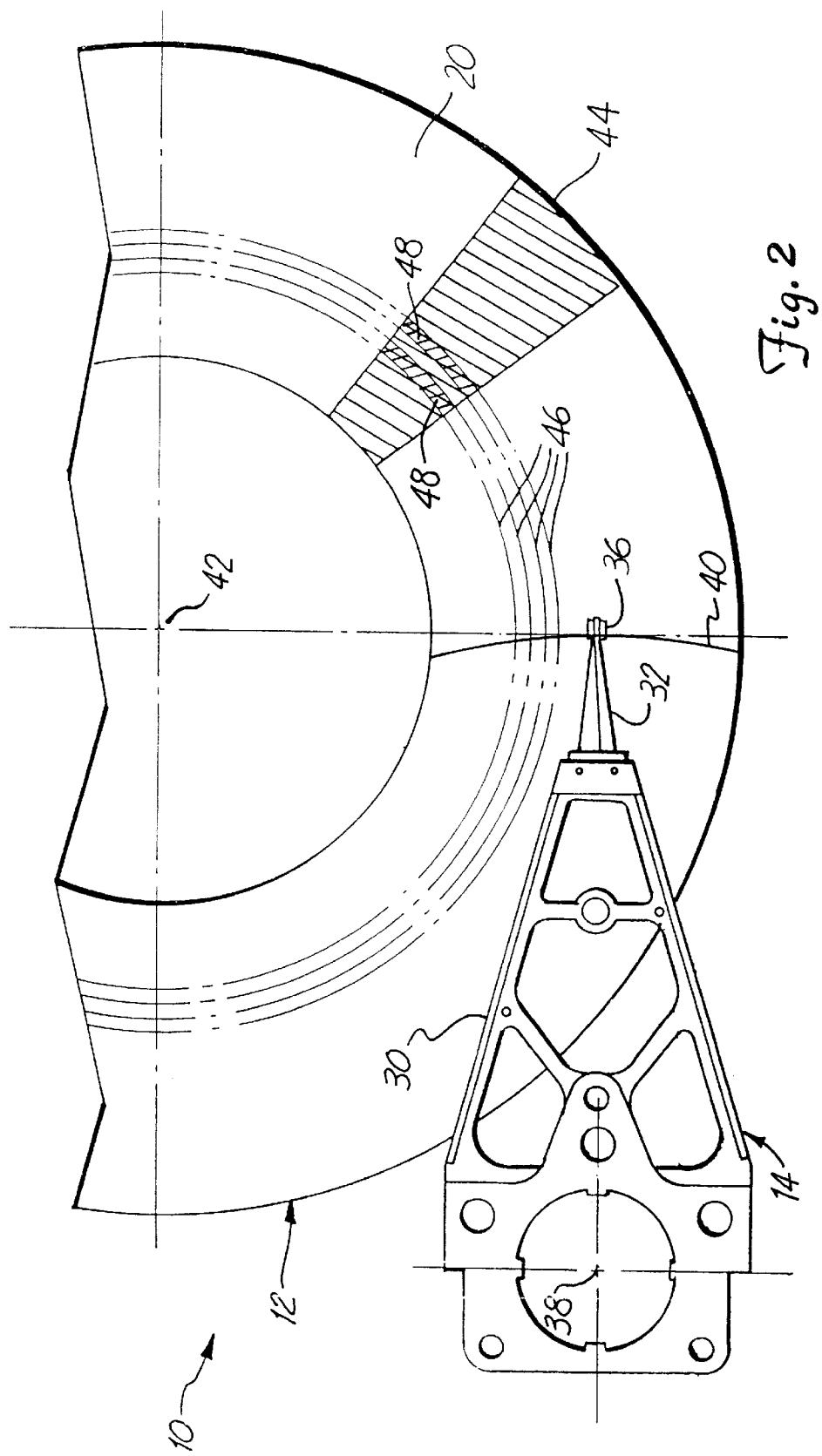
FIG. 2 is a top view of a disc and actuator.

FIG. 2 is a top view of a disc 20 and actuator 14. In FIG. 2, actuator 14 rotates about axis of rotation 38. As actuator 14 rotates, support arm 30 and flexure arm 32 move slider 36 along arc 40.

Disc 20 of disc pack 12 rotates around axis of rotation 42. Disc 20 is angularly divided into a series of sections 44, and radially divided into a series of tracks 46. The intersection of each track 46 with each section 44 forms a sector 48. Sectors 48 are the smallest data storage unit available on the disc.

As disc 20 rotates about axis of rotation 42, sectors pass under slider 36. The intersection of slider 36 and a track 46 forms a skew angle. Because there is a gap between the read and write elements and slider 36, this skew angle gives rise to a read-to-write offset.

Figure 3:
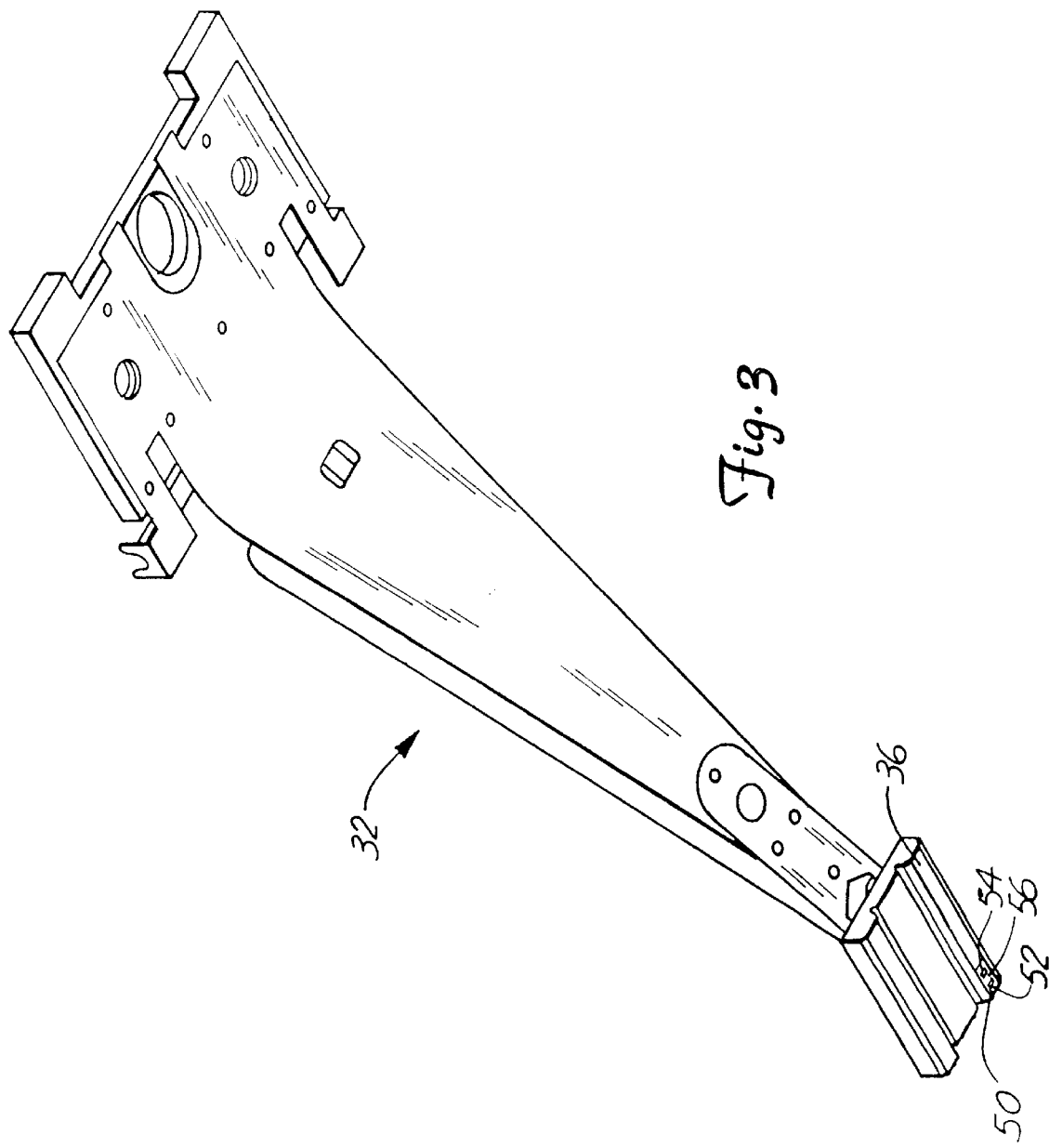
FIG. 3 is a view of a flexure arm shown in FIG. 2, along with a slider which carries a transducer having separate read and write elements.

FIG. 3 is a view of flexure arm 32 and slider 36 of FIG. 2 as viewed from the perspective of disc surface 20. Slider 36 carries transducer 50. Transducer 50 is comprised of write element 52 and read element 54. A gap 56 separates write element 52 from read element 54.

Figure 4:
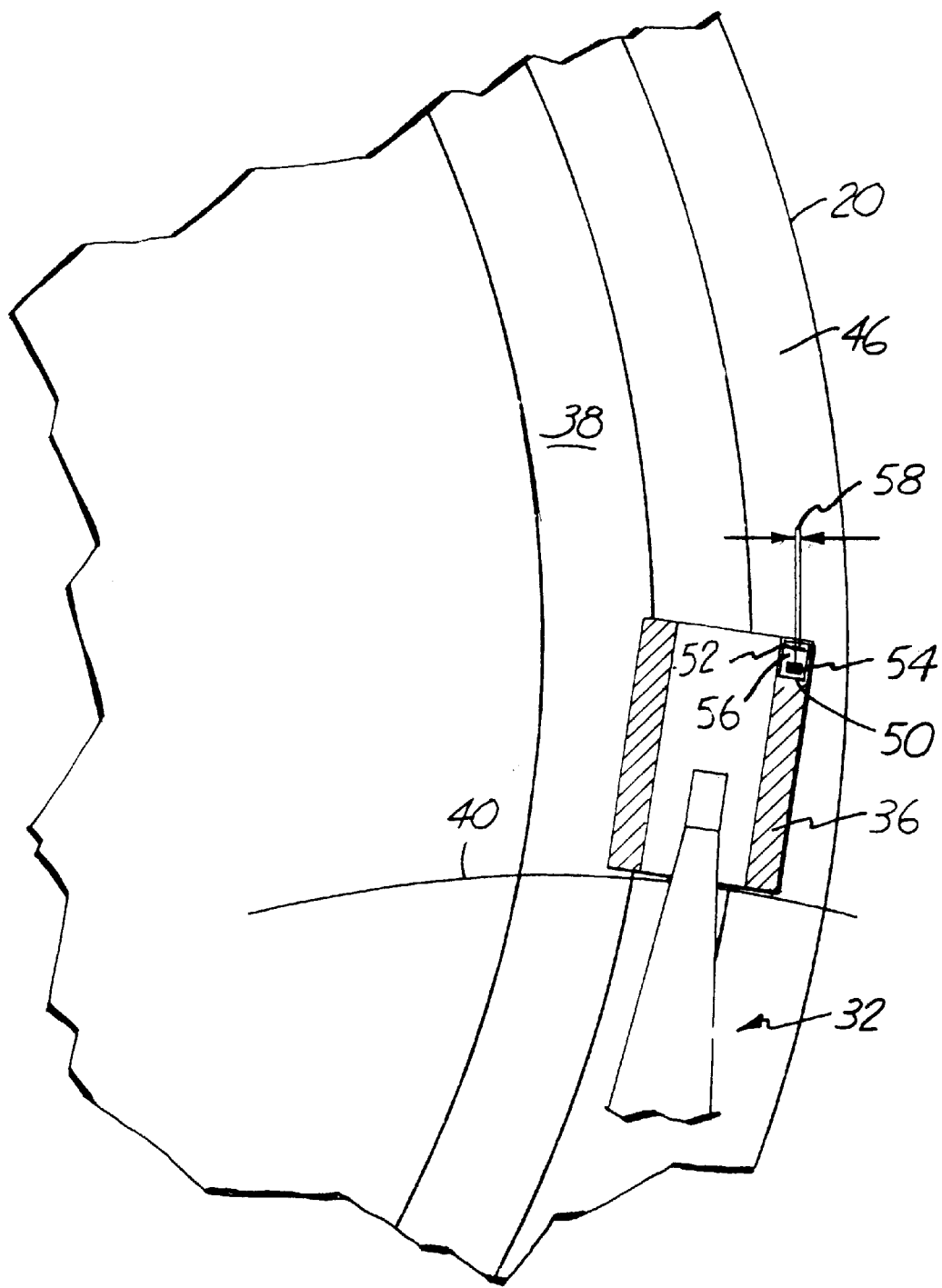
FIG. 4 is an expanded view of the slider of FIG. 3 over an outer track of the disc of FIG. 2.

FIG. 4 is an enlarged view of slider 36 and disc 20 in FIG. 2, with slider 36 positioned over an outer track 46. Accordingly, flexure arm 32 is positioned at an end of arc 40, resulting in a substantial skew angle between slider 36 and track 46. Because of gap 56 between write element 54 and read element 50, a substantial read-to-write offset 58 is present at this track.

Figure 5:
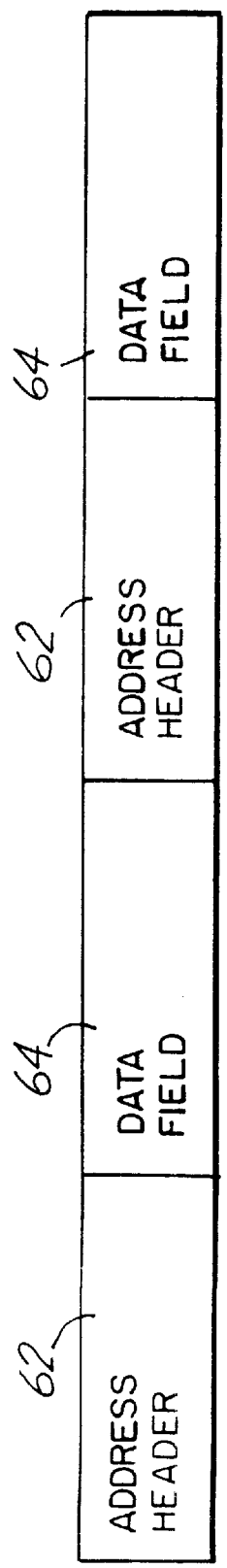
FIGS. 5 and 6 show prior art data storage formats.

FIG. 5 is a diagram showing prior art data storage format 60. Format 60 is comprised of an alternating sequence of address headers 62 and data fields 64. Address headers 62 store address information which identifies the respective addresses of the data fields. Data fields 64 store user data.

In a disc drive using prior art read/write thin film transducer heads, the head is positioned directly over a track containing format 60. During a write operation, an address field 62 is read and compared to a target address. If the address read from an address header 62 matches the target address, the data field 64 passing under the thin film transducer immediately after is written with the target data. During a read operation, an address header 62 is read and compared to a target address. If the address read from the address header 62 matches the target address, the next data field 64 is read and the data is provided to the host computer system.

In a disc drive system having a transducer with a gap 56 between write element 52 and read element 54, write operations are significantly more complex. Read element 54 of transducer 50 must be positioned over format 60 to read address headers 62. As soon as a target data field has been identified, actuator 14 must perform a minijog to position write element 52 over data field 60, so that write element 52 can write data into the target data field 64. However, performing such a minijog between reading address header 62 and writing data field 64 is not practical in a modern high performance disc drive system.

Figure 6:
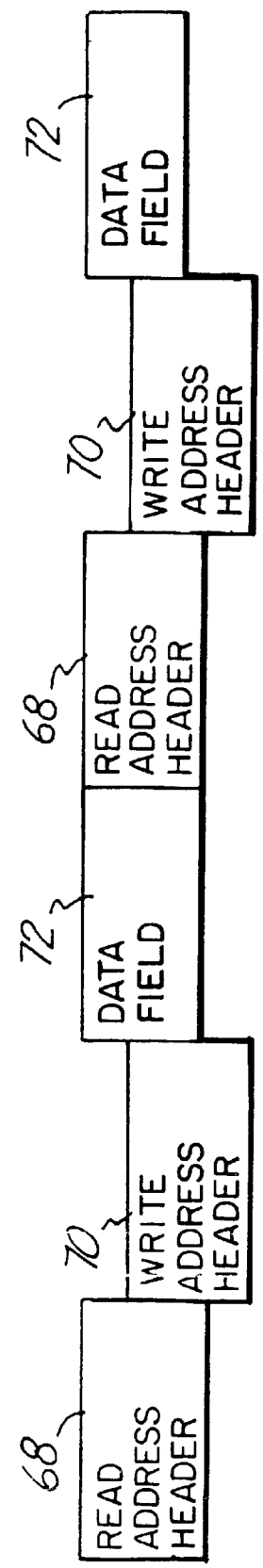

FIG. 6 shows a data storage format 66 in accordance with U.S. Pat. No. 5,257,149 to Forest C. Meyer and entitled disc drive with offset address field, which is assigned to the same assignee as the present application. This format was designed specifically for data storage systems having a gap between read and write elements.

Data format 66 is comprised of a successive series of read address headers 68, write address headers 70, and data fields 72. During a read operation, read element 54 is positioned over read address headers 68. If an address read from a read address header 68 matches the target address, the data stored in the next data field 72 is read by read element 54 and provided to the host computer system.

During a write operation, read element 54 is positioned over write address headers 70. Write address headers 70 are offset from read address headers 68 and data fields 72 by an offset magnitude based on skew angle and the gap 56 between the read element 54 and write element 52.

During a write operation, read element 54 reads write address headers 70. If an address read from a write address header 70 matches a target address, the next data field 72 is written with the target data. Since the data fields 72 are offset from the write address header 70 by the same magnitude as the read-to-write offset of this track, write element 52 will already be positioned over the data field 72.

Compared to prior art format 60 of FIG. 5, format 66 is faster because a minijog in track position of the head is not required after reading an address header and before writing data into a data field. In a high-speed disc drive formatted according to format 60, it is not practical to perform the minijog between the reading of the address header 62 and the writing of the next data field 72.

Regardless of whether a disc drive is formatted according to format 60 or 66, the disc drive system must be able to perform a minijog equal to the read-to-write offset 58 found at any given track. Using format 60, the minijog must be performed at a critical moment during a write operation. Using format 66, the minijog need not be performed at such a critical time but must still be performed when switching between read and write operations.

In addition to performing a minijog based on the read-to-write offset found at any given track, the gap between read and write elements may vary by as much as 100 microinches from transducer to transducer. Accordingly, a disc drive must not only compensate for an offset based on the gap and skew angle, it must also compensate for variations between individual transducers within the same disc drive. Accordingly, it is essential that a disc drive must be provided with means for compensating for the read-to-write offset of every transducer, and at every track.

Figure 7:
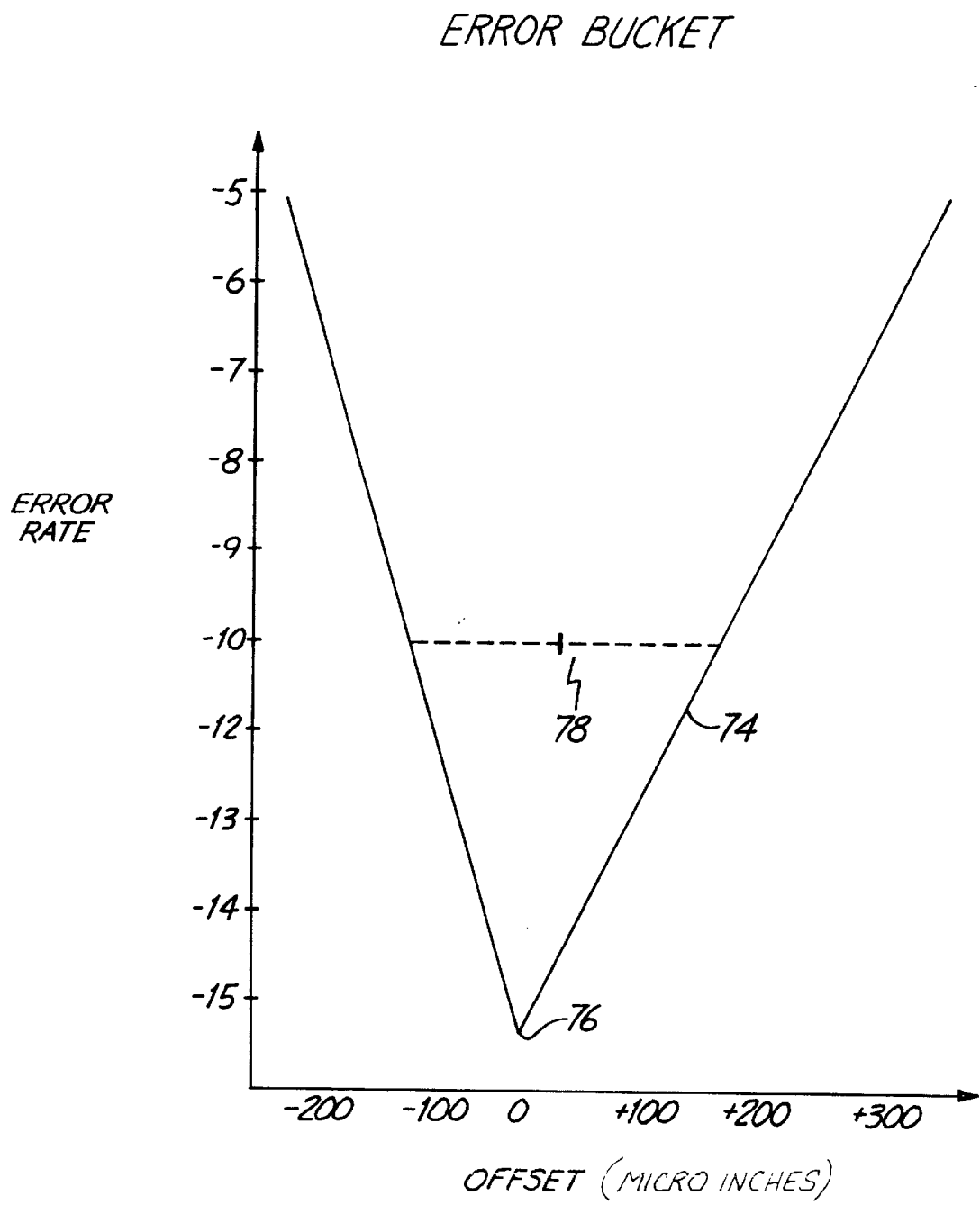
FIG. 7 is a graph showing read error rate versus offset for a typical disc drive track.

FIG. 7 is a graph showing the error rate of read operations versus offset from a track center. In a typical disc drive system, error correction codes are provided which allow errors to be dynamically detected and corrected. Track offset is plotted along the X axis and error rate is plotted along the Y axis. In this figure, error rate is expressed logrithmically as the reciprocal of the average number of bits read between an error. In other words, $$\text{error rate} = e^y,$$

where y represents the numbers along the Y axis. Accordingly, an error rate of −10 is approximately equivalent to 1 bit error in every 22,000 correctly read bits. The curve 74 shown in FIG. 7 is known in the art as an "error bucket." The center of the error bucket corresponds with the center of the track, which was the radial position of write element 52 when the track data was written. If the read-to-write offset at this radial position is non-zero, read element 54 will not be centered in the error bucket if the actuator is moved to that same radial position.

MR sensors typically have an asymmetric read sensitivity zone. Accordingly, it is common for an MR sensor to exhibit an asymmetric error bucket. In FIG. 7, the left portion of curve 74 is steeper than the right portion to illustrate this phenomenon. Because of this, it may be desirable to determine the mid-point between two points of the curve at a predetermined error rate. For example, in FIG. 7, point 78 is the mid-point between the two slopes of curve 74 that intercept an error rate of −10. Alternatively, one may wish to establish the mid-point at 76, which is the point having the lowest error rate. The tolerances and accuracy of the actuator are factors which must also be considered when selecting a center point.

The present invention is a method for determining the read-to-write offset for a specified transducer at a specified track. Basically, the method comprises writing to a track with write element 52 (or using an existing track), and plotting the error bucket with read element 54, which of course will be offset from write element 52 by the read-to-write offset at that track. Once the error bucket has been mapped, either point 76 or 78 can be defined as the read-to-write offset for the specified transducer at the specified track.

Figure 8A:
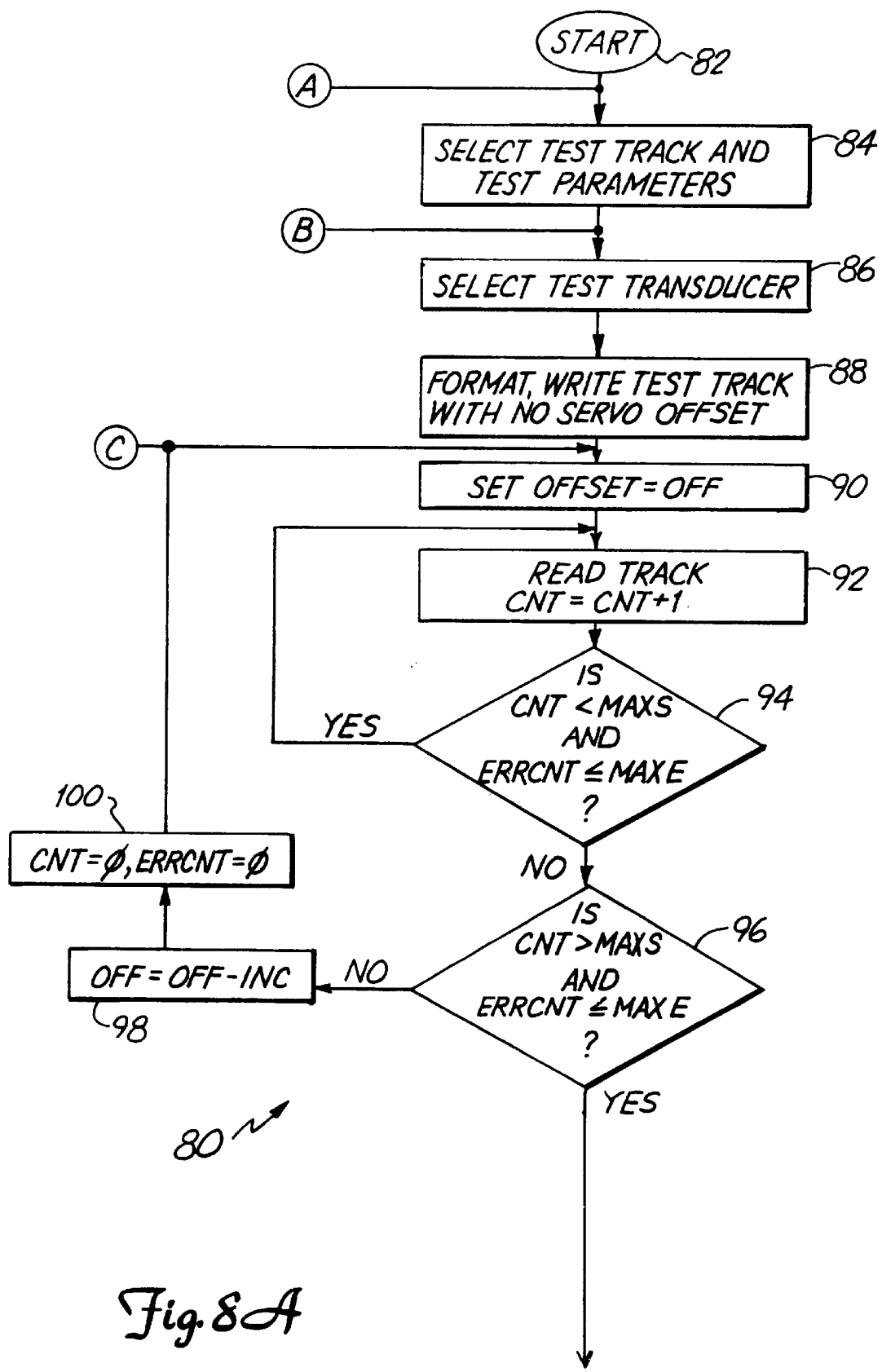
FIGS. 8A and 8B are a flow chart illustrating the process of the present invention.
Figure 8B:
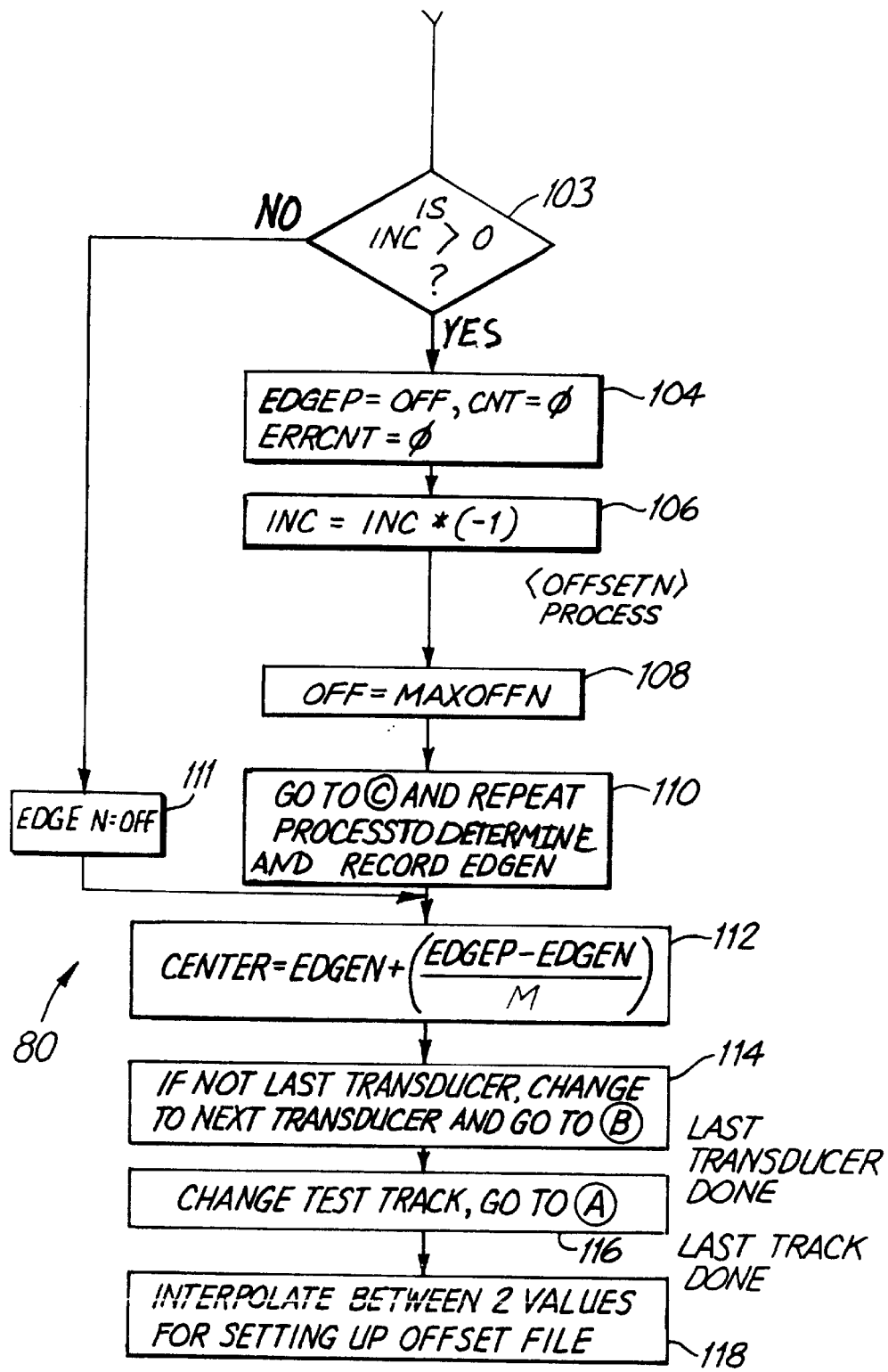

FIGS. 8A and 8B show flow chart 80, which illustrates the method of the present invention. This method will determines the read-to-write offset for a single transducer at a single track, and interpolates the measured data to calculate the read-to-write offset of the other tracks accessed by the transducer. This method employs several constants which do not change during the performance of the method. These constants are:

| | |
|---|---|
| MAXS = | The maximum number of read operations allowed per servo offset position. |
| MAXE = | The maximum number of errors allowed per servo offset position. |
| MAXOFFN = | The maximum negative offset from the center of the track. |
| MAXOFFP = | The maximum positive offset from the center of the track. |
| M = | Factor used to calculate midpoint between negative and positive edges. Typical value = 2. |

In addition, there are several variables which change during the performance of the method. These variables, and their initial values, are

| | |
|---|---|
| INC = 2: | The step changed in offset which is used to map the error bucket. |
| CNT = 0: | Current count of the number of read operations performed. |
| ERRCNT = 0: | Current read error count. |
| OFF = MAXOFFP: | Current offset in error bucket. |
| EDGEP = MAXOFFP: | Positive edge of error bucket based on MAXE and MAXS. |
| EDGEN = MAXOFFN: | Negative edge of error bucket based on MAXE and MAXS. |

The method is initiated at step 82. At step 84, the test track and test parameters are selected. At step 86, the test transducer is selected. Step 88 formats the test track and writes the track with test data. Step 88 will be skipped if the method is being performed on a disc containing user data. Step 88 also defines writing a test track with no offset.

In a typical disc drive, a command is issued to position the slider over a track. This command also includes an offset. A zero offset positions the slider over the center of the track. By including a positive or negative offset with the command, the actuator will offset the slider from the center of the track based on the magnitude and sign of the offset included with the command. Typically, a single offset increment will move the actuator on the order of a couple of microinches. In addition, a typical actuator controller will allow approximately 50 increment steps (plus or minus) from the center of the track. Accordingly, at step 88 the track will be formatted with the read element positioned above the track center.

At step 90, the actuator is moved to a position where the offset of the actuator is set to a position equal to the variable OFF. Since the variable OFF was originally set to the constant MAXOFFP, this position will correspond to the maximum allowed offset in the positive direction. At step 92, the track is read data is transferred from circuit 18 to processor 19, and the variable CNT is incremented. The variable ERRCNT is set by the error detection and correction circuitry of the disc drive system. Step 94 is a decision step to determine whether CNT is less than the constant MAXS and whether ERRCNT is less than or equal to the constant MAXE. During the first pass, the actuator was positioned at the maximum positive offset, so it is likely that the error count will exceed the constant MAXE. Accordingly, the "NO" branch will initially be taken to decision step 96. Step 96 is a decision step that determines if the variable CNT has exceeded the constant MAXS and if the variable ERRCNT is less than or equal to MAXE. In this first pass, CNT will not have exceeded MAXS and ERRCNT will have exceeded MAXE. Accordingly, the "NO" branch will initially be taken to step 98. At step 98, the step change offset variable INC will be subtracted from the variable OFF. The variable INC is initially set to 2. However, empirical data may suggest that another number, such as 1 or 3, is more appropriate. At step 100 the variables CNT and ERRCNT will be reset to zero. At this point, execution will branch back to block 90.

To illustrate in FIG. 7, if MAXOFFP had been set to an offset equivalent to +300 microinches, a read operation would have produced an error rate of −5; an unacceptable rate. Next, the variable INC is subtracted from the variable OFF, and the actuator is moved slightly toward the center of the track. The next iteration of this loop will produce an error rate slightly less than the previous iteration. Execution will continue through this loop until the error rate is acceptably low.

In FIG. 7, an error rate of −10 has been selected as being acceptable. Once this error rate is reached, execution will continue between steps 94 and 92 until the variable CNT equals the constant MAXS. This is to ensure that the error rate recorded at this track is not an aberration, and can be depended on as the actual error rate of this offset.

After the variable CNT has reached the constant MAXS, execution will continue at step 103. Step 103 determines whether the variable INC has been multiplied by −1, which occurs at step 106. Since INC will initially be positive, execution will proceed to step 104. At step 104, the variable EDGEP set equal to the variable OFF, which is the offset at which an acceptable error level has been measured, and the variable CNT and ERRCNT are reset to zero.

At step 106, the sign of the variable INC is inverted by multiplying it by −1, and the offset is set to MAXOFFN at step 108. At step 110, execution is directed to label C, execution proceeds back through the loop again to detect the same error level on the other side of the track center. Execution will proceed as describe above to step 103. Since the variable INC has been inverted, the "no" branch will be taken from step 103 to step 111. At step 111, the variable EDGEN is set equal to the variable OFF, which represents the offset at which an acceptable error level has been measured.

At step 112, the center point which corresponds to point 78 in FIG. 7, is determined by dividing the difference between EDGEP and EDGEN by the constant M, and adding that quantity to EDGEN. Typically, M will be two. However, it may desirable to determine point 76 in FIG. 7, in which case M will be set to another value, such as 1.8 or 2.2.

At step 114, the method determines whether additional transducers need to be measured and sends execution back to label B. Step 116 changes the test track and branches to label A. Finally, at step 118, two measured test points are interpolated to determine a read-to-write offset for every transducer at every track.

As noted above if the method of the present invention is to determine point 76 in FIG. 7 instead of point 78, the constant M can be adjusted based on empirical observations. Alternatively, a lower value for MAXE may be selected, which will cause point 78 to approach point 76. However, it may not be practical to set the point so low that point 76 is detected precisely. At point 76, billions of read operations may have to be performed to produce a single error. Accordingly, it may not be feasible to measure this point due to the length of time involved. Therefore, as an alternative to adjusting M, the method can be modified to determine the slopes of the left and right portion of curve 74, so that point 76 can be determined by interpolation.

Figure 9:
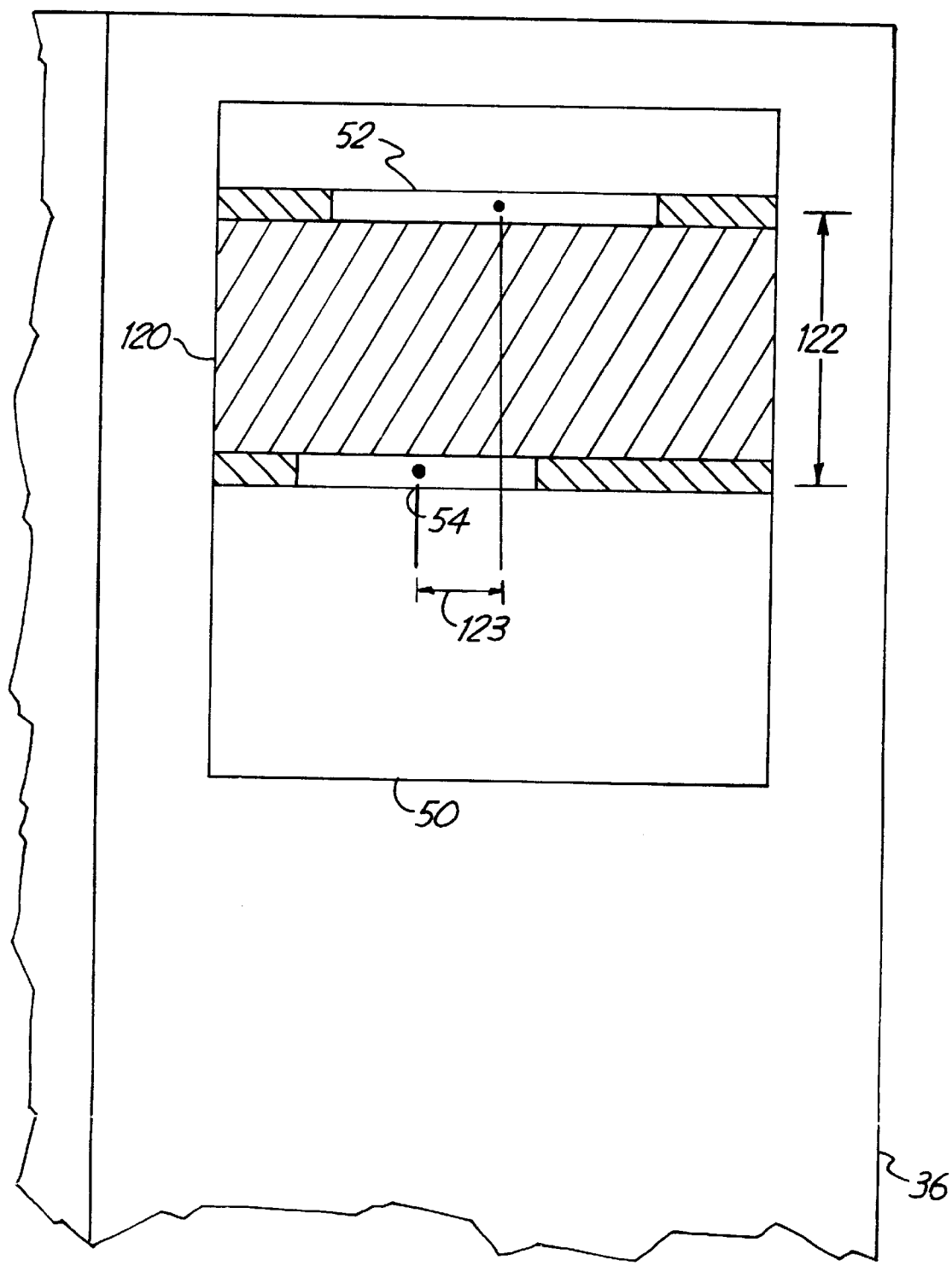
FIG. 9 is an enlarged view of the transducer of FIG. 4, showing a gap between the read and write elements.

FIG. 9 is an enlarged view of transducer 50, which is carried by slider 36 of FIGS. 3 and 4. FIG. 9 depicts a typical transducer construction. Transducer 50 is assembled by laminating together various layers. In FIG. 9, write element 52 is separated from read element 54 by spacing layer 120. In a typical transducer, there are many other layers present and laminate 120 may be comprised of several layers of different material. The purpose of showing layer 120 is to illustrate that the gap 122 between elements 52 and 54 is a relatively constant because it is determined by the thicknesses of the intervening layers. However, the gap 123 between the centers of elements 52 and 54 is quite variable because it is determined by the positioning of the layers during the manufacturing process. Gap 23 can vary from transducer to transducer on the order of 100 microinches.

Because gap 122 is relatively fixed, and gap 123 is variable, gap 123 can be viewed as being correctable by simply moving the actuator by an offset equal to 123. Accordingly, since the geometry of similar disc drives is similar, a plot of the read-to-write offset for a given transducer versus track position will have a straight line with a known slope. The slope of the line will be relatively constant from transducer to transducer and drive to drive. However, the Y intercept of the line will vary from transducer to transducer based on the magnitude of the gap 123 in FIG. 9.

Figure 10:
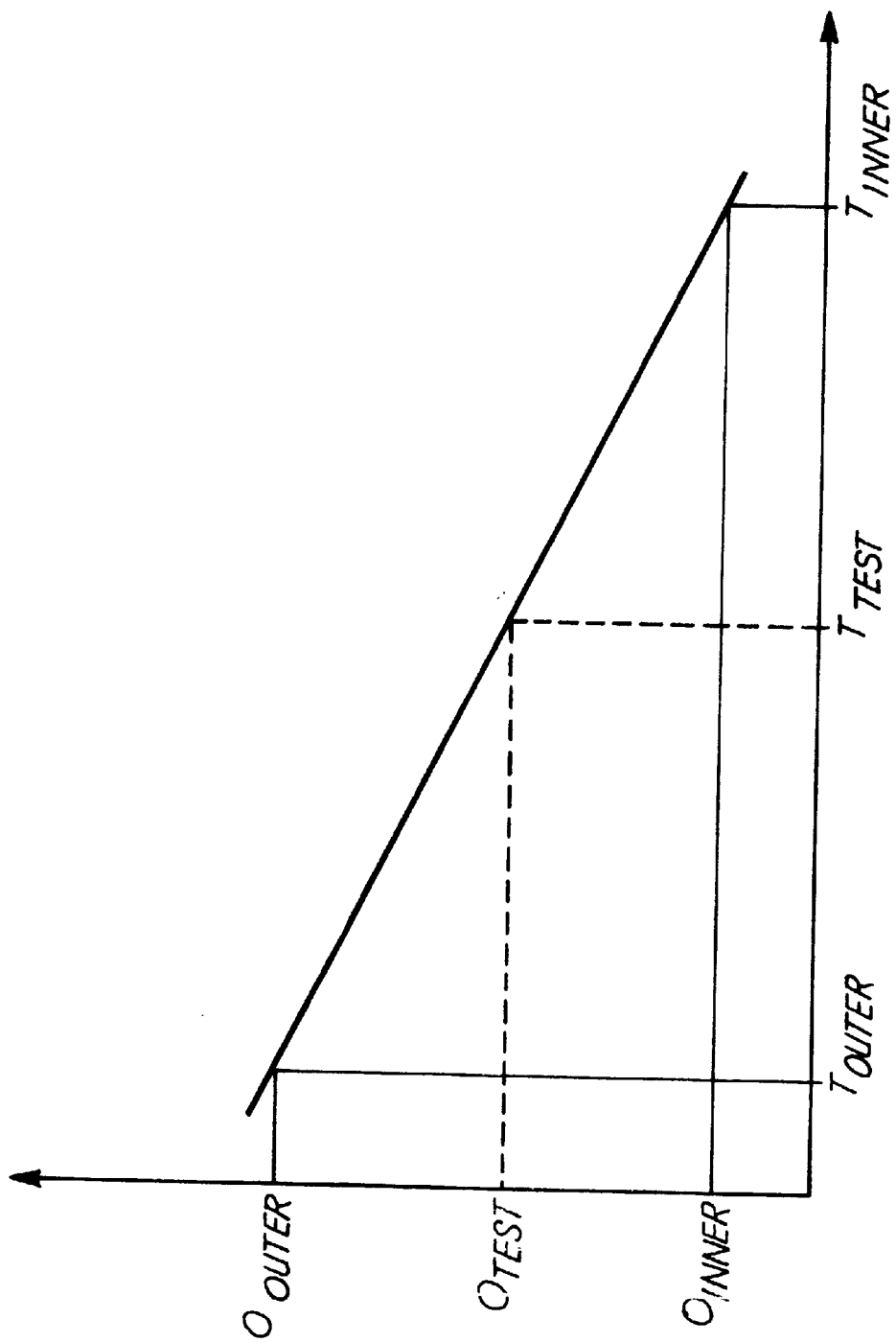
FIG. 10 is a graph showing the read-to-write offset versus radial track position for a typical disc drive transducer.

FIG. 10 is a graph showing offset magnitude plotted against track number. As previously mentioned, the slope of this line will remain relatively constant from transducer to transducer and from drive to drive. However, the Y intercept will change. Accordingly, a profile of the read-to-write offset for every track on a disc surface can be determined by measuring the read-to-write offset for a single track on the disc surface. Once a single track is measured, the read-to-write offset of all tracks can be determined by using the slope shown in FIG. 10. Accordingly, in FIG. 8, the method of flow chart 80 need only perform the test for a single transducer, and then the offset determined in step 112 can be applied to graph 10 to determine the offset for every other track accessed by that transducer. This is represented in step 118.

If, however, the curve shown in FIG. 10 should prove to be too simple of an approximation, additional tracks can be measured and the read-to-write offsets measured at these tracks can be applied to an appropriate predetermined curve. At worst, the offset can be measured for every track and every transducer in a disc drive, but this will produce a large amount of data which must be stored by the disc drive.

After the read-to-write offset has been determined, it is stored in a disc drive configuration profile, typically EPROM, ROM, or the servo disc, which is read into a memory table when the drive is powered up. Accordingly, when the drive must access a particular track using a particular transducer, the offset will be calculated.

The present invention provides a reliable method of measuring the read-to-write offset of a transducer having separate read and write elements. The method uses existing error detection and correction circuitry and a disk drive processor to map an error bucket. No additional hardware is required. By using existing circuitry, the method of the present invention can measure the read-to-write offset of a disc drive operating in the field with user data. Alternatively, the method can be used with a test track that is formatted and written for the purpose of measuring the read-to-write offset.

Although the present invention has been described with reference to preferred embodiments, workers skilled in the art will recognize that changes may be made in form and detail without departing from the spirit and scope of the invention.

What is claimed is:

1. A method of determining read-to-write offsets of a plurality of tracks on a disc surface of a disc in a disc drive system, the disc drive system including a slider which carries separate read and write elements, and an actuator that positions the slider over selected tracks of the plurality of tracks, the method comprising:

positioning the slider at a first positive test position based on a maximum positive offset position from a center of a test track of the plurality of tracks, and at the first positive test position:
  reading data from the test track;
  measuring a first read error rate in the data read from the test track; and
  comparing the first read error rate to an edge error rate;

positioning the slider at a second positive test position intermediate the first positive test position and the center of the test track based on an offset increment, and at the second positive test position:
  reading data from the test track;
  measuring a second read error rate in the data read from the test track; and
  comparing the second read error rate to the edge error rate;

setting a positive edge equal to the second positive test position if the first error rate is not less than the edge error rate and the second error rate is not more than the edge error rate;

calculating the read-to-write offset for the test track, based on the positive edge; and calculating a different read-to-write offset for each other track of the plurality of tracks, other than the test track, with each different read-to-write offset based on the read-to-write offset of the test track the radial position of the respective track, and a function based on variations in read-to-write offsets radially across the plurality of tracks.

2. The method of claim 1 wherein:

the positive edge is set by iteratively operating the actuator to incrementally position the slider at successive positive intermediate offset positions toward the center of the test track from the first positive test position, reading data at each positive intermediate offset position, measuring a positive intermediate read error rate at each positive intermediate offset position, and setting the positive edge equal to the positive intermediate offset position when the positive intermediate read error rate is not more than the edge error rate.

3. The method of claim 1 and further comprising:

positioning the slider at a first negative test position based on a maximum negative offset position from a center of the test track, and at the first negative test position:

reading data from the test track;

measuring a third read error rate in the data read from the test track; and comparing the third read error rate to the edge error rate;

positioning the slider at a second negative position intermediate the first negative test position and the center of the test track based on the offset increment, and at the second negative test position:

reading data from the test track;

measuring a fourth read error rate in the data read from the test track; and comparing the fourth read error rate to the edge error rate;

setting a negative edge equal to the second negative test position if the third error rate is not less than the edge error rate and the fourth error rate is not more than the edge error rate; and determining the read-to-write offset for the test track from the positive and negative edges.

4. The method of claim 3 wherein:

the positive edge is set by iteratively operating the actuator to incrementally position the slider at successive positive intermediate offset positions toward the center of the test track from the first positive test position, reading data at each positive intermediate offset position, measuring a positive intermediate read error rate at each positive intermediate offset position, and setting the positive edge equal to the positive intermediate offset position when the positive intermediate read error rate is not more than the edge error rate; and the negative edge is set by iteratively operating the actuator to incrementally position the slider at successive negative intermediate offset positions toward the center of the test track from the first negative test position, reading data at each negative intermediate offset position, measuring a negative intermediate read error rate at each negative intermediate offset position, and setting the negative edge equal to the negative intermediate offset position when the negative intermediate read error rate is not more than the edge error rate.

5. The method of claim 1 wherein the function based on variations in read-to-write offsets radially across the tracks represents a graph of a line.

6. A method of determining offsets of a transducer from a center of each of a plurality of tracks on a disc surface of a disc in a disc drive system having an actuator for placing the transducer adjacent a selected track of the plurality of tracks, the method comprising:

mapping an error bucket of a first track of the plurality of tracks;

determining first and second actuator offsets from the error bucket;

determining the offset of the transducer from the center of the first track from the difference of the first and second actuator offsets; and determining a different offset for each other track of the plurality of tracks, other than the first track, with each different offset based on the offset of the first track the radial position of the respective track and a function based on variations in offsets radially across the plurality of tracks.

7. The method of claim 6 and further comprising: formatting the first track at a first actuator offset.

8. The method of claim 6 wherein mapping the error bucket comprises:

positioning the transducer at a first positive test position based on a maximum positive offset from a center of the first track, and at the first positive test position comparing a read error rate to a first predetermined read error limit;

iteratively positioning the transducer at successive intermediate positive positions toward the center of the first track; setting a positive edge at the intermediate positive position when the read error rate is less than the first predetermined read error limit;

positioning the transducer at a first negative test position based on a maximum negative offset from a center of the first track, and at the first negative test position comparing a read error rate to a second predetermined read error limit;

iteratively positioning the transducer at successive intermediate negative positions toward the center of the first track; and setting a negative edge at the intermediate negative position when the read error rate is less than the second predetermined read error limit.

9. The method of claim 6 wherein the function based on variations in offsets radially across the tracks represents a graph of a line.

10. The method of claim 6 wherein determining the offset of the first track includes dividing the difference of the first and second actuator by a factor to account for a asymmetry in the read sensitivity of the read element.

11. The method of claim 6 wherein the transducer includes separate read and write elements and wherein the offset and each different offset is a respective read-to-write offset.

* * * * *